Patented May 2, 1950

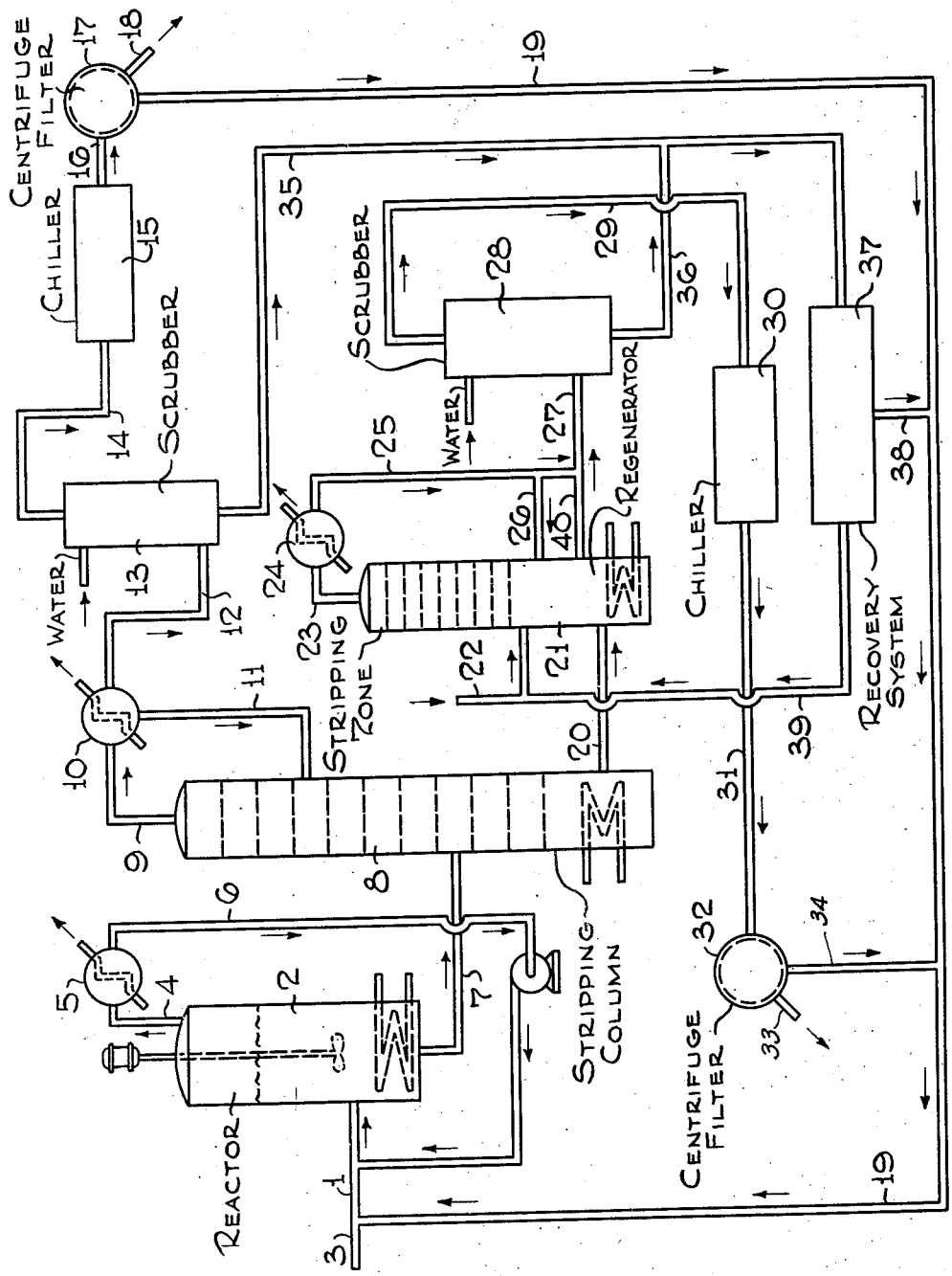

2,506,289

UNITED STATES PATENT OFFICE 2,506,289

PROCESS FOR THE SEPARATION OF ISOMERS

Leland K. Beach, Mountainside, and Joseph F. Nelson, Rahway, N. J., and Joseph Stewart, Brooklyn, N. Y., assignors to Standard Oil Development Company, a corporation of Delaware Application October 5, 1948, Serial No. 52,944

6 Claims. (Cl. 260—674)

This invention relates broadly to a method for separating chemically related aromatic hydrocarbons by selective reactions and more specifically to the use of certain organo-metallic compounds for the separation of isomeric hydrocarbons.

In many fields of hydrocarbon chemistry, and particularly, in the petroleum and related industries there are frequently encountered mixtures of closely related aromatic hydrocarbons which are difficult, if not impossible by known procedures, to separate into the specific components. This is especially true for certain commonly occurring substituted aromatic hydrocarbon mixtures of nuclear isomers such as the xylenes, diethylbenzenes, ethyltoluenes, trimethylbenzenes, and alkylnaphthalenes. Mixtures of such compounds obviously offer many problems in separations since they are structural isomers of each other and have quite similar physical and chemical properties.

One of the most frequently encountered and difficult separations of this type is the separation of mixtures containing varying amounts of xylene isomers. These mixtures occur in various petroleum fractions as well as the products of coal tar processing. Many methods have been proposed to effect isolation of the ortho, meta, and para isomers as chemical entities, particularly for use in the chemical process industries in recent years. These isomers can be used to give pure phthalic anhydride, phthalic acid, phthalimide, nitrophthalic acid and anhydride, ortho, meta, and para-toluic acids, xylidenes, terephthalic acid, chloroxylenes, and many other derivatives. Methods which have been tried with varying degrees of success include distillation, crystallization, preferential sulfonations, and oxidations, and various modifications and combinations of these. However, no process satisfactory from every standpoint has yet been devised.

It has now been discovered that a very selective reaction can be used successfully to separate into components various mixtures of aromatic hydrocarbons. It is particularly useful for separation of isomeric polyalkyl benzenoid hydrocarbons such as xylenes, diethylbenzenes, cymenes, and ethyltoluenes. This reaction consits of the selective metallation of the aromatic nuclei using mercuric salts and, in particular, mercuric salts of the lower fatty acids such as mercuric butyrate, mercuric propionate or mercuric acetate as the reagent.

The mercuration of certain aromatic nuclei has long been known and is described in the prior art. For instance, direct substitution of mercury into aromatic nuclei by the action of such salts as the acetate on benzene and thiophene is well known. However, there has been no indication that mercuric acetate, when allowed to react with a mixture of the isomeric hydrocarbons such as xylenes, would exhibit a pronounced selectivity toward the meta isomer and that this selectivity would be so pronounced and of such magnitude as to afford an excellent basis for a separation procedure for the isomers.

The separation step may be performed in a variety of ways. It may be done either as a continuous process or, if more convenient, it may be carried out as a batch operation. The conditions are somewhat critical for obtaining optimum results in separating any particular mixture. The process is subject to certain changes in pressure, temperatures, time, concentrations of reactants during the metallation reaction, and other variables depending on the composition of mixtures being treated, completeness of separation desired, and types of isomers which occur in the mixture.

In general, it has been found most desirable to react the mercuric acetate with the mixture of hydrocarbons without other solvents present, under such conditions that one isomer forms a mercuric acetate derivative while the others show substantially no reactivity. In the case of the xylenes it has been found that temperatures of around 140°–160° C., sufficiently high to maintain continuous reflux if the operation is carried out at atmospheric pressures, are quite selective in nature and give mainly the mercuric acetate nuclear metallation product of the meta isomer while leaving the other isomers substantially unreacted. In general, the meta isomer appears to react preferentially when using mixtures of dialkyl benzenoid hydrocarbons. The reaction is reversible and appears to follow a course as formulated by the equation:

$$C_8H_{10} + Hg(AcO)_2 \rightleftharpoons C_8H_9HgAcO + AcOH$$

The degree of completion of reaction may be followed accurately by analysis of the reaction mixture for free acetic acid by usual methods such as titration.

Since the equilibrium state of the reaction appears to be reached rather quickly and seems to be in the direction to produce the metallized product, the reaction is quite satisfactory for a separation method. For xylene mixtures, the meta xylene-mercuric acetate compound forms relatively rapidly and time required for the reaction takes only, at the most, a few hours.

Stripping is a very excellent way to remove the unreacted hydrocarbon from the reaction products particularly if the hydrocarbon is easily volatile, although other methods such as selective extraction can also be used. Vacuum or atmospheric distillations can be employed. Stripping with a gas inert to the reagents and products offers certain operational advantages.

The mercuric acetate reaction product can, if desired, be used as such, for instance, as a chemical intermediate to produce pharmaceuticals, germicides, insecticides and other valuable products.

However, by a very simple regeneration step, it is possible to recover the original hydrocarbon in a relatively pure state. The mercuric acetate compounds, while generally quite stable under ordinary conditions, can be readily decomposed by a short heating in the presence of acids or bases. This is best done by heating the compound with mineral acids, or any acid having an ionization constant of at least $1 \times 10^{-5}$. Glacial acetic acid is used advantageously, since its use results essentially in a recovery of pure mercuric acetate. For example, the compound derived from meta-xylene is split by such treatment to give meta-xylene and the corresponding mercury salt. The hydrocarbon which has undergone the selective metallation reaction is then separated from the mercury salt-acid mixture by any suitable method, such as stripping, and is recovered quantitatively.

There are, of course, many modifications and variations of the process possible. The unconverted hydrocarbon feed may be recycled to give a further separation or it may be sent to another unit or process for additional purification or it may be used as such. The regenerated product may be recycled to the stripping stage, or it may be sent to a further stage or process for further purification or it may be used as such.

There can, of course, be utilized a selective metallation of more than one isomeric compound from the feed. It is also entirely possible to recover more than one product from the reaction mixture. It is contemplated to recover both pure isomers and isomer-enriched fractions by application of the process.

Although it is not intended to limit this reaction in any way to a chemical theory, it is believed that the relatively rapid reaction exhibited by the meta isomers in comparison to the much slower reactivity shown by the other isomers may be related to the rather unusual directive influences sometimes exhibited by alkyl groups positioned meta to each other on the aromatic nucleus.

The invention will be described in fuller detail by the following examples.

*Example 1*

A mixture of xylenes particularly rich in the meta and para isomers can be obtained by processing a hydrocarbon fraction containing various amounts of xylene isomers such as is obtained from petroleum sources. One method, for example, which can be used starts with sugar fractionation of a mixture, having a high xylene content, in a column having at least 100 plates and using a high reflux ratio to remove substantially all the ortho-xylene as bottoms product and give a mixture of meta and para-xylenes as the overhead product. This mixture can then be subjected to known controlled crystallization procedures to separate out pure para-xylene, and yielding a eutectic consisting of about 88 mole percent meta-xylene and 12 mole percent para-xylene. The further separation of such a mixture or of any meta and para-xylene mixture omitting the crystallization step can be carried out using mercuric acetate. The operation will be more readily understood by reference to the accompanying flow diagram which represents a continuous purification process to produce greatly enriched fractions of meta and para-xylenes.

The mixture of meta and para-xylenes is fed continuously by line 1 to the closed, stirred, reactor 2 which has suitable heating means such as a steam coil. Through make-up inlet line 3 there is introduced into the reactor a sufficient amount of mercuric acetate to react with the meta-xylene. The reaction mixture is stirred and refluxed whereby the meta isomer reacts preferentially to form a mercuric acetate derivative. A part of the reflux is removed through line 4 to condenser 5 from which it is recycled back to the reactor through line 6. The reaction mixture containing some unreacted xylene and the mercuric acetate complex is transferred by line 7 to an intermediate point of a suitably heated stripping column 8 which can, if desired, be operated at reduced pressure. There is taken off the stripping column 8, as an overhead fraction by line 9 as the acetic acid azeotrope a para-xylene-enriched vapor which is condensed by condenser 10. A part of this condensed reflux is preferably returned to the column by means of line 11. At least a part of the para-enriched fraction is removed and this may be further purified to get pure para-xylene. For example, this portion can be taken through line 12 to a water scrubber 13 where it is contacted countercurrently with an incoming water stream to remove acetic acid. Dilute acetic acid is removed by line 35. From the top of scrubber 13 through line 14 there is removed the para-enriched xylene fraction which is taken to a chiller and scraper 15 where a slurry of pure para-xylene crystals in the meta-para eutectic liquid is formed by controlled cooling. This slurry is transferred by line 16 to a continuous centrifuge 17 from which pure para-xylene crystals are recovered from line 18. The para-xylene crystals may be washed with naphtha for further purification, if desired. The liquid meta-para eutectic mixture is removed by line 19 from the centrifuge 17 and recycled back to reactor 2.

From the lower portion of the stripping column 8 there is removed through line 20 the meta-xylene-mercuric acetate reaction product in conjunction with some xylenes and acetic acid. This product is taken to a regenerator reaction chamber 21 equipped with heating means and the top of which constitutes a stripping or fractionating zone. There is added by make-up line 22 an amount of glacial acetic acid somewhat in excess of that necessary to decompose the mercuric acetate-meta-xylene reaction product by reversal of the equilibrium reaction. The vapor from the top of the stripping zone is led by line 23 to a condenser 24. The condensed acetic acid and meta-xylene mixture is taken by line 25 from which a part is returned at inlet 26 to the regenerator chamber 21 and a part is taken by line 27 to a water scrubber 28. Here the mixture is contacted countercurrently with water to remove soluble impurities. The acetic acid-mercuric acetate solution from the bottom of 21 is led to scrubber 28 through line 40. Any hydrocarbon present in this stream floats to the top of the scrubber and is removed with the hydrocarbon obtained from line 25. From the bottom of water scrubber 28 by line 36 there is obtained dilute acetic acid containing mercuric acetate. This mixture is combined with the dilute acetic acid from line 35 and sent to a suitable recovery and purification system 37 from which there is obtained glacial acetic acid which is taken by line 39 back to make-up feed line 22 for the regenerator 21. Mercuric acetate from the recovery system is sent by line 38 through line 19 back to feed line 1 for reactor 2. Through top line 29 from water scrubber 28 there is removed a xylene fraction greatly enriched in the meta isomer. This fraction is taken to a chiller and scraper 30 where by controlled cooling there is produced a slurry of meta-xylene crystals in the liquid meta-para eutectic mixture. This slurry is transferred by line 31 to a continuous centrifuge 32 from which there is obtained pure meta-xylene crystals through outlet 33. The meta-para eutectic mixture can be recycled by lines 34 and 19 back to feed line 1 and into reactor 2.

Operation of a continuous process as shown in the above example is not limited to the type or arrangement of apparatus shown. The reactors may be of the kettle, tower, tube or series type. The stirring may be accomplished by other means of agitation, such as bubbling the reacting mixture with an inert gas, by means of turbulent flow of the reactor contents in a tube reactor, or by any other conventional means. Operating temperatures, pressures, space velocities, and other operating conditions may be varied as desired to adjust product purities and equipment capacities. Operating conditions are also somewhat dependent upon the feed composition.

Example 2

A batch operation is carried out by heating at reflux temperature for about one hour, a mixture of 159 parts by weight of mercuric acetate, 53 parts of meta-xylene and 53 parts of para-xylene. The reaction mixture is subjected to vacuum stripping. The relative completion of the reaction can be ascertained at any time by analysis of the reaction mixture for total released acetic acid content. The unreacted xylene which is stripped from the reaction mixture shows a para-xylene content of 78 percent as compared to a para-xylene content of 50 percent in the starting mixture. After the stripping operation is completed, the crude mercuric acetate-meta-xylene compound is decomposed by refluxing with glacial acetic acid. The regenerated meta-xylene can then be stripped from the mixture. It is found to contain over 70 percent meta-xylene, indicating that a good separation of isomers has been accomplished and greatly enriched fractions obtained. These fractions may be further purified in any way desired as by crystallization.

Example 3

The reaction is carried out as described in Example 2. However, after the stripping operation is completed, the crude mercuric acetate-meta-xylene compound is decomposed by treating it with a mixture of one part hydrochloric acid diluted with one part of water. The meta-xylene is then stripped from the mixture as described above.

When pure para-xylene is subjected to the action of mercuric acetate at reflux temperatures for a period of 48 hours, substantially no reaction occurs to yield a mercuric acetate product.

We claim:

1. A process for separating hydrocarbon mixtures which comprises selectively reacting mercuric acetate with a mixture consisting essentially of isomeric polyalkyl benzenoid hydrocarbons including ortho, meta, and para isomers, whereby the meta isomers preferentially form the mercuric acetate compounds and the ortho and para isomers remain essentially unreacted, separating the unreacted ortho and para hydrocarbons from the mercuric acetate-hydrocarbon product, decomposing the non-volatile mercuric acetate-hydrocarbon product to regenerate the meta hydrocarbons and mercuric acetate and separating the said regenerated hydrocarbons from the mercury-containing residue.

2. A process for separating hydrocarbon mixtures which comprises selectively reacting, at an elevated temperature, mercuric acetate with a volatilizable mixture of polyalkyl benzenoid hydrocarbons including ortho, meta, and para isomers, whereby the meta isomers preferentially form the mercuric acetate compounds and the ortho and para isomers remain essentially unreacted, stripping the unreacted ortho and para hydrocarbons from the reaction mixture, decomposing the non-volatile mercuric acetate-hydrocarbon product with an acid having an ionization constant of at least $1 \times 10^{-5}$ to regenerate the meta hydrocarbons and mercuric acetate, and stripping the said regenerated hydrocarbons from the mercury-containing residue.

3. A process for separating difficultly separable hydrocarbon mixtures which comprises refluxing a mixture of isomeric dialkyl benzenoid hydrocarbons including ortho, meta, and para isomers with mercuric acetate, whereby the meta isomers preferentially form the mercuric acetate compounds and the ortho and para isomers remain essentially unreacted, stripping from the reaction mixture a hydrocarbon fraction containing relatively greater percentages of the ortho and para isomers than did the initial mixture of isomeric hydrocarbons, decomposing the non-volatile mercuric acetate compound with acetic acid to regenerate the meta isomers and mercuric acetate, and stripping the regenerated meta isomers from the mercuric acetate residue.

4. A process according to claim 3 in which the stripping steps are carried out under reduced pressure and using steam.

5. A process for separating a mixture of isomeric xylenes including ortho, meta, and para isomers which comprises refluxing mercuric acetate with a mixture of xylenes whereby the meta isomers preferentially react to form the mercuric acetate compounds and the ortho and para isomers remain essentially unreacted, stripping from the reaction mixture a xylene fraction containing relatively greater percentages of the ortho and para isomers than did the initial mixture of isomeric xylenes, decomposing the non-volatile mercuric acetate compound with acetic acid to regenerate the meta isomers and mercuric acetate, and stripping the regenerated meta isomers from the mercuric acetate residue.

6. A process for separating a mixture consisting of meta and para-xylenes which comprises refluxing mercuric acetate with a mixture consisting essentially of meta and para-xylenes, stripping at reduced pressure a para-xylene-enriched hydrocarbon fraction from the reaction mixture, refluxing the non-volatile mercuric acetate compound with acetic acid whereby said compound is decomposed, and stripping a metaxylene-enriched hydrocarbon fraction from the mercuric acetate residue.

LELAND K. BEACH.
JOSEPH F. NELSON.
JOSEPH STEWART.

REFERENCES CITED

The following references are of record in the file of this patent:

UNITED STATES PATENTS

| Number | Name | Date |
|---|---|---|
| 1,311,848 | Leppers | July 29, 1919 |
| 2,393,888 | Cole | Jan. 29, 1946 |

OTHER REFERENCES

Jour. Arm. Chem. Soc., vol. 69 (1947), pages 908–911 (Morton et al.).